United States Patent [19]
Abel

[11] Patent Number: 5,495,062
[45] Date of Patent: Feb. 27, 1996

[54] METHODS OF DECONTAMINATING NUCLEAR WASTE-CONTAINING SOIL

[75] Inventor: Albert E. Abel, Powell, Ohio

[73] Assignee: Commodore Laboratories, Inc., Columbus, Ohio

[21] Appl. No.: 304,791

[22] Filed: Sep. 12, 1994

[51] Int. Cl.$^6$ .............................. G21F 9/00; B03B 5/28
[52] U.S. Cl. .................................... 588/1; 209/2
[58] Field of Search ................... 588/1; 134/12; 209/2

[56] References Cited

U.S. PATENT DOCUMENTS 4,853,040  8/1989  Mazur et al. ..................... 134/2
4,880,607  11/1989  Horton et al. ................... 423/20
5,110,364  5/1992  Mazur et al. ..................... 134/2
5,411,574  5/1995  Turney et al. ..................... 75/743

*Primary Examiner*—Ngoclan Mai
*Attorney, Agent, or Firm*—Howard M. Ellis

[57] ABSTRACT

Soil including sand and clays contaminated with nuclear waste materials are decontaminated by treating with anhydrous liquid ammonia alone or in combination with solvated electrons. Methods comprise concentrating radionuclides, such as plutonium and uranium in the fines of soil and clay to yield residual soil products which are sufficiently free of contaminants to allow reclamation. Economics are improved over aqueous systems since ammonia can be recovered and recycled. By concentrating nuclear wastes in soil fines space requirements ordinarily needed for storage of untreated soil and handling costs can be significantly reduced.

18 Claims, 1 Drawing Sheet

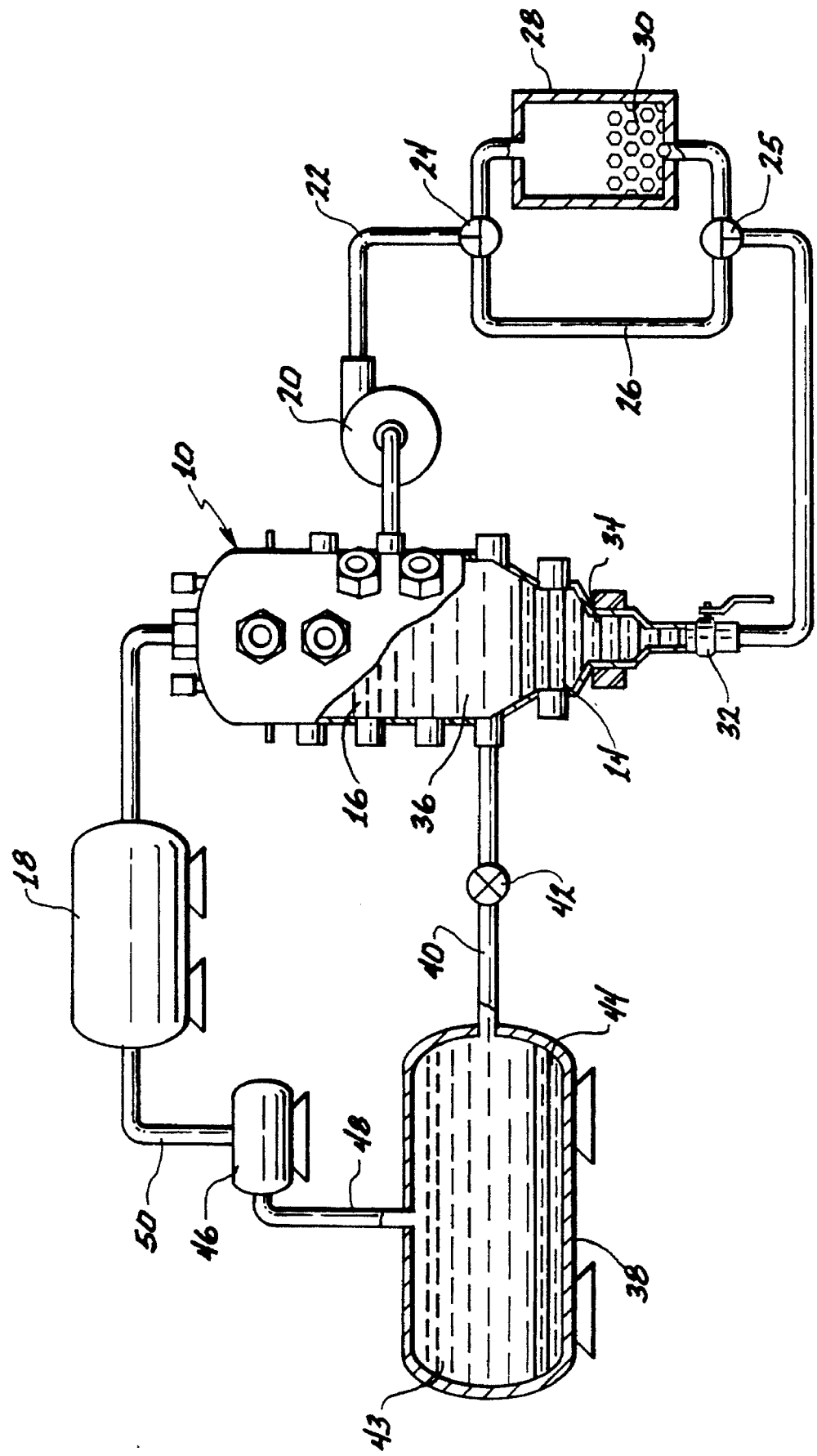

METHODS OF DECONTAMINATING NUCLEAR WASTE-CONTAINING SOIL

TECHNICAL FIELD

The present invention relates to methods of decontaminating soil, and more specifically, to the decontamination of nuclear waste-containing soils by methods which also permit the reclamation of residual soil products.

BACKGROUND OF THE INVENTION

As a result of military testing programs involving the detonation of nuclear devices, both in the United States and abroad, the environment, and particularly vast areas of soil in testing zones have become contaminated with nuclear waste materials. In some instances, for example, detonation of a nuclear device failed to achieve the needed critical mass of the radioactive components, resulting in substantial quantities of enriched uranium and plutonium being scattered over wide areas of desert testing grounds. In addition to nuclear testing programs, contamination of soil with radioactive materials has occurred at nuclear weapon manufacturing sites, such as at Hanford, Wash.; Rocky Flats, Colo.; Savannah River, Ga.; Oak Ridge, Tenn., and elsewhere through spills or releases into the environment.

Efforts to successfully decontaminate these sites have proven difficult and extremely costly due to massive amounts of soil requiring treatment and/or storage. Cleanup has usually meant a slow and costly process where the contaminated soil is excavated and transferred to a different location for storage. Abandoned salt mines and mountain repositories have been proposed as storage facilities for nuclear wastes, but too often rejected later on for technical and/or political reasons. Because of a finite amount of space available for storage of nuclear waste materials progress in the reclamation of contaminated sites has been slow.

In an effort to mitigate the nuclear waste storage crisis systems for reducing bulk quantities of contaminated soil requiring storage have been proposed wherein the radioactive components are concentrated in a soil fraction. One system, for example, employs an aqueous washing process requiring the use of soil scrubbing chemicals, multiple separation steps, water treatment, and so on. Although quite effective in concentrating radioactive components in silt and clay fractions of soil, capital and operating costs per ton of soil treated are viewed as economically unattractive. Consequently, most methods proposed for concentrating nuclear waste have not received wide acceptance.

Accordingly, there is need for an innovative, cost-effective process for decontaminating soils containing nuclear waste materials, such as those generated at sites of nuclear weapon plants, nuclear testing sites, and wherever treatment calls for managing substantial volumes of soil contaminated with radioactive materials. The process should enable reduction of the space otherwise required for storage of untreated soils by concentrating in a small fraction of the soil while also permitting reclamation of these sites.

SUMMARY OF THE INVENTION

It is therefore a principal object of the invention to provide improved, more economic methods for separating radioactive components from contaminated soil wherein the treated soil is made sufficiently free of the potentially toxic radioactive components as to permit reclamation of the soil. The expression "sufficiently free" is intended to mean soil treated according to the present invention so it (i) is practically devoid of all unwanted radioisotopes (radionuclides), or (ii) contains residual amounts of low-level radioisotopes allowing treated soil to be reclaimed as is, or (iii) contains amounts of low-level radioisotopes which can be diluted sufficiently with an inert material to reduce its activity to an acceptable level.

Expressions, such as "nuclear waste" and "radioactive waste" as recited in the specification and claims are intended to refer to soils contaminated with isotopic forms of elements having unstable nuclei which disintegrate and emit energy most commonly as alpha particles, beta particles and gamma rays. They include mainly products or by-products of nuclear fission or unreacted products of a nuclear device. Representative examples include such radionuclides as $Cs^{137}$; $Co^{60}$; $K^{40}$; $Pu^{235}$; $U^{235}$; $U^{238}$; $Ru^{103}$; $Te^{99}$; Sr; Rb; Y; Re; Rh; Pd; Tc; Np and Am.

Methods of the invention provide for the recovery of nuclear waste materials in soil fractions, particularly in small, high surface area particles, such as soil fines and silt fractions of clay for subsequent storage or further treatment. By concentrating nuclear waste materials in soil fines and clay silt, for example, storage space requirements per ton of soil treated are significantly reduced, perhaps by as much as 90 percent over storage space requirements otherwise required for untreated soils.

Methods of the invention comprise the steps of:

(a) mixing a liquid ammonia with a soil contaminated with nuclear waste in a closed vessel to form an ammonia-nuclear waste containing soil dispersion or slurry;

(b) allowing soil particles to selectively precipitate from the slurry or dispersion of step (a) to form a lower solid phase of soil particulates while forming an upper liquid-solid phase comprising soil fines dispersed in the liquid ammonia. The soil particulates of the lower solid phase have a greater bulk density relative to the soil fines of the upper liquid-solid phase;

(c) separating the upper liquid-solid phase from the lower solid phase of soil particulates, the fines of the upper liquid-solid phase having the majority of the radionuclide contaminant(s), or in other words, the lower solid phase is sufficiently free of the nuclear waste materials, and (d) separating the ammonia from the soil fines containing the nuclear waste material for disposal or further treatment of the fines.

The term "disposal" is intended to include storage of the nuclear waste-containing soil fines. The expression "further treatment" is intended to include any procedure which will modify the potentially toxic properties of the radionuclide material to substances of reduced toxicity and impact on the environment, or to materials which can be recovered as useful by-products. It will be understood, methods of storage and further treatment of the concentrated nuclear waste material do not constitute part of this invention. Such methods are known by persons skilled in the art.

Mazur et al in U.S. Pat. No. 5,110,364 disclose ammonia as a pretreatment in desorbing organic compounds, and particularly halogenated organic compounds like PCBs from soil, followed by chemical destruction of the compound by dehalogenation through a chemical reduction mechanism with solvated electrons. Mazur et al, however, fail to teach or suggest utilizing ammonia as a means of separating soil into fractions wherein the larger, lower surface area particulates are allowed to separate out from the less dense liquid ammonia-solid phase containing the smaller, higher surface area soil fines. In contradistinction, the methods of Mazur et al provide for treating "whole" soil in the reduction of the halogenated carbon compound contaminants without first isolating particles from the slurry containing the highest concentration of the contaminant.

Serendipitously, it was found that radionuclides appear to have a preferential affinity for the smaller, higher surface area fines and silts of soils, clays and sand. Hence, by isolating the fines and silt particulates, especially the smaller particles having higher surface areas relative to the particles precipitating out of ammonia-soil dispersions one, in effect, is selectively concentrating the nuclear waste material in the smallest volume of natural solid carrier material to effectively lessen the tonnage volume of material requiring storage or further treatment. Accordingly, it is a primary objective of the invention to provide an improved more economic method for concentrating a substantial portion of the nuclear waste material in a reduced soil fraction for more efficient management of soil cleanup projects involving large volumes of soil, so as to permit reclamation of major volumes of previously contaminated soil.

It is still a further object of the invention to optionally include the step of recovering and recycling for reuse in the foregoing process the ammonia from step (d), the recovery and recycling being performed by methods already known in the art. For purposes of this invention, the expression "liquid ammonia" as used herein is intended to include anhydrous liquid ammonia or ammonia-containing solutions, such as aqueous ammonia solutions.

It is still a further object to provide an additional embodiment of the invention for decontaminating soil containing nuclear waste by the steps of:

(a) mixing a liquid ammonia with soil contaminated with nuclear waste in a closed vessel to form an ammonia-nuclear waste-containing soil dispersion or slurry;

(b) treating the dispersion or slurry of step (a) with solvated electrons by contacting with a reactive metal;

(c) allowing soil particles to selectively precipitate from the dispersion or slurry of step (b) to form a lower solid phase of soil particulates while forming an upper liquid-solid phase comprising soil fines suspended in the liquid ammonia, the soil particulates of the lower solid phase having a greater bulk density relative to the soil fines of the upper liquid-solid phase;

(d) separating the upper liquid-solid phase from the lower solid phase of soil particulates, the lower solid phase of soil particulates being sufficiently free of the nuclear waste, and (e) separating the ammonia from the soil fines for disposal or further treatment of the fines.

While this inventor has observed that ammonia has a unique ability to form very fine slurries when mixed with soils, it was observed that dispersions of soil appear to be further altered by some mechanism not fully understood, when in the presence of solvated electrons formed by dissolving metal reactions with ammonia. That is, by contacting the ammoniated soil dispersion with either an alkali or alkaline earth metal, solvated electrons are formed in the mixture, in-situ. The solvated electrons appear in some instances to optimize separation of smaller soil fines. In some instances where particle size cross-section is larger than desired, electrons solvated in liquid ammonia appear to provide more optimal demarcation and separation of the smaller fines containing nuclear waste materials from other particles of the slurry.

As in the first embodiment of the invention, the foregoing second embodiment of the invention contemplates the step of recovering and recycling the ammonia from step (e) for reuse. Similarly, the precipitated residual solid soil particles of step (d) are sufficiently free of radioisotopes to permit reclamation of large bulk volumes of soil.

BRIEF DESCRIPTION OF THE DRAWING

The drawing is a schematic of a best mode for practicing the invention in which radionuclides in contaminated soil are concentrated in a reduced soil fraction.

DESCRIPTION OF THE PREFERRED EMBODIMENTS

The invention relates to improved methods for separating from soil unwanted nuclear waste material, particularly the radionuclides as previously disclosed, by concentrating in very small particles or fines of soil or clay. The concentrated radionuclide-containing fines thus are in a state which permits more efficient disposal, such as by storage, or for further treatment to modify the radionuclides to less toxic and more environmentally benign substances.

The methods are based on the observation that ammonia possesses the unique ability to break up soils into very fine slurries. It was also found that suspensions of what appear to be extremely fine particles of soil can be prepared by mixing with ammonia. In the methods, radionuclide-contaminated soils are mixed, preferably with anhydrous liquid ammonia, to form finely-dispersed suspensions or slurries. Because of the lower density of ammonia relative to water, significantly smaller soil particles were found to remain in solution, and particles which would otherwise be suspended in water readily precipitate from the dispersion. The larger bulk fraction of the soil consisting of larger precipitated particles are sufficiently free of the radionuclide contaminant as to permit recycling and reclaiming of large volumes of the treated soil.

The following specific example demonstrates the invention, however, it is to be understood it is for illustrative purposes only and does not purport to be wholly definitive as to conditions and scope.

EXAMPLE

Methods of the invention can be carried out by means of a system, such as that illustrated by the drawing. A closed reactor 10 is utilized as a mixing vessel for nuclear waste contaminated soil 14 positioned at the bottom of the vessel. The term "soil" is intended to have its ordinary understood meaning, and includes one or more components in varying proportions, such as of clay, stone, disintegrated rock particles or sand, organic matter, along with varying amounts of water and the like. Obviously, soil compositions will vary widely depending on source and location. For instance, soils from desert or other arid locations are mainly sandy compositions with little organic material. One representative soil from the State of Ohio known as Ohio Loam was found to have an analysis of 35% sand, 32% silt, 33% clay and 4.1% organic matter and have a pH 7.7. By contrast soil from Oak Ridge, Tenn. was found to contain only 1% sand, 26% silt, 73% clay, no organic matter, and have a pH of 5.2. In sum, the term "soil" for purposes of this invention is intended to have a broad compositional makeup, including varying ranges of clay, disintegrated rock/sand particulates, organic matter, silt-fines, moisture and so on. This would include soils which are mainly clay or sand.

Anhydrous liquid ammonia 16 or a solution of liquid ammonia containing a small amount of water is introduced to closed reactor 10 from ammonia storage vessel 18. Once filled, liquid ammonia is withdrawn from reactor 10 from below the surface of the liquid by circulating pump means 20 positioned in outlet line 22. The flow of ammonia is directed by means of 3-way diverter valves 24–25 to either by-pass line 26 or to solvator 28 containing a bed of reactive metal 30, such as alkali or alkaline earth metals or mixtures of the same. Suitable representative metals include sodium, potassium, lithium, calcium and magnesium. Aluminum would also a suitable reactive metal. By circulating ammonia 16 through a bed of metal in reactor 28 solvated electrons are formed in-line. This avoids the problems associated with injecting metal rods or other metal sources directly to reaction vessel 10. Accordingly, methods of the present invention contemplate the option of enhanced particle size demarcation and separation of radioactive components in fines of soil and clay with ammonia and electrons solvated in the ammonia.

Whether ammonia circulates through by-pass line 26 or through solvator 28 the solution is recirculated to the bottom of reactor 10 through valve 32, setting up a fluidized flow pattern in the reactor. This produces a mixing action of the soil and ammonia solution and/or solvated electrons to form a slurry. Once the soil has been uniformly dispersed in the ammonia, pump 20 is deactivated to allow the dispersion to undergo phase separation, i.e. a lower solid phase and an upper liquid-solid phase. Large particulates of the dispersion precipitate out as solid phase 34 in the bottom of reactor 10, and are sufficiently free of radionuclide contaminants, the latter being concentrated in a smaller soil fraction consisting of fines or silt dispersed in the ammonia solution as upper liquid-solid phase 36.

The slurry of suspended particle fines forming the upper liquid-solid phase 36 is withdrawn from reactor vessel 10 to evaporator tank 38 via line 40 by opening valve 42. Ammonia 43 is evaporated to separate it from radioactive fines. 44. Optionally, the ammonia can be transferred via line 48 to compressor 46 for reliquification if it is desired to recycle the ammonia for further use in the decontamination process. The liquified ammonia is then transferred to ammonia storage tank 18 through line 50.

Thus, the methods of the disclosed invention provide the advantages of separating nuclear waste by means of smaller particles than relied on using aqueous based systems; permits recycling of ammonia not otherwise achieved with systems relying on more costly scrubbing chemicals; provides means for readily separating fines from liquid ammonia; eliminates transport and storage of water to desert locations, and provides additional means for controlling particle sizes within a predetermined range with solvated electrons.

While the invention has been described in conjunction with various embodiments, they are illustrative only. Accordingly, many alternatives, modifications and variations will be apparent to persons skilled in the art in light of the foregoing detailed description, and it is therefore intended to embrace all such alternatives and variations as to fall within the spirit and broad scope of the appended claims.

I claim:

1. A method of decontaminating soil containing nuclear waste, which comprises the steps of:
   (a) mixing a liquid ammonia with a soil contaminated with nuclear waste in a closed vessel to form an ammonia-nuclear waste-containing soil dispersion or slurry;
   (b) allowing soil particles to selectively precipitate from the dispersion or slurry of step (a) to form a lower solid phase of soil particulates while forming an upper liquid-solid phase comprising soil fines dispersed in said liquid ammonia, the soil particulates of said lower phase having greater bulk density relative to the soil fines of said upper liquid-solid phase;
   (c) separating said upper liquid-solid phase from said lower solid phase of soil particulates, the lower solid phase being sufficiently free of said nuclear waste, and
   (d) separating the ammonia from the soil fines containing the nuclear waste material for disposal or further treatment of said fines.

2. The method of claim 1 including the step of recovering and recycling the ammonia from step (d).

3. The method of claim 1 wherein the liquid ammonia of step (a) is anhydrous liquid ammonia or an ammonia-containing solution.

4. The method of claim 3 wherein the nuclear waste comprises at least one radionuclide, and the soil comprises at least one member selected from the group consisting of clay, disintegrated rock and organic matter.

5. The method of claim 3 wherein the nuclear waste contaminated soil comprises mainly sand.

6. The method of claim 4 wherein the soil of step (a) comprises a radionuclide selected from the group consisting of uranium, plutonium and mixtures thereof.

7. The method of claim 5 wherein the sand comprises a radionuclide selected from the group consisting of uranium, plutonium and mixtures thereof.

8. The method of claim 1 including the step of separating the ammonia from the soil fines of step (d) by distillation means.

9. A method of decontaminating soil containing nuclear waste, which comprises the steps of:
   (a) mixing a liquid ammonia with a soil contaminated with nuclear waste in a closed vessel to form an ammonia-nuclear waste-containing soil dispersion or slurry;
   (b) treating the dispersion or slurry of step (a) with solvated electrons by contacting with a reactive metal;
   (c) allowing soil particles to selectively precipitate from the dispersion or slurry of step (b) to form a lower solid phase of soil particulates while forming an upper liquid-solid phase comprising soil fines dispersed in said liquid ammonia, the soil particulates of said lower phase having a greater bulk density relative to the soil fines of said upper phase;
   (d) separating said upper liquid-solid phase from said lower solid phase of soil particulates, the lower solid phase being sufficiently free of said nuclear waste, and
   (e) separating the ammonia from the soil fines containing the nuclear waste material for disposal or further treatment of said fines.

10. The method of claim 9 including the step of recovering and recycling the ammonia from step (e).

11. The method of claim 9 wherein the liquid ammonia is anhydrous liquid ammonia and the reactive metal is a member selected from the group consisting of alkali metal and alkaline earth metal.

12. The method of claim 11 wherein step (b) is performed by circulating at least a portion of the ammonia-containing slurry through a by-pass containing the reactive metal where it dissolves and the slurry is recirculated to the closed vessel for treating the balance of the slurry with solvated electrons.

13. The method of claim 11 wherein the liquid ammonia of step (a) is anhydrous liquid ammonia or an ammonia-containing solution.

14. The method of claim 13 wherein the nuclear waste comprises at least one radionuclide, and the soil comprises at least one member selected from the group consisting of clay, disintegrated rock and organic matter.

15. The method of claim 13 wherein the nuclear waste contaminated soil comprises mainly sand.

16. The method of claim 14 wherein the soil of step (a) comprises a radionuclide selected from the group consisting of uranium, plutonium and mixtures thereof.

17. The method of claim 15 wherein the sand of step (a) comprises a radionuclide selected from the group consisting of uranium, plutonium and mixtures thereof.

18. The method of claim 9 including the step of separating the ammonia from the soil fines of step (e) by distillation means.

* * * * *